Nov. 27, 1934.   H. C. DOWNEY   1,981,856
RETRACTABLE LANDING GEAR
Filed Nov. 2, 1932   5 Sheets-Sheet 1

INVENTOR
HUGH C. DOWNEY
BY
ATTORNEYS

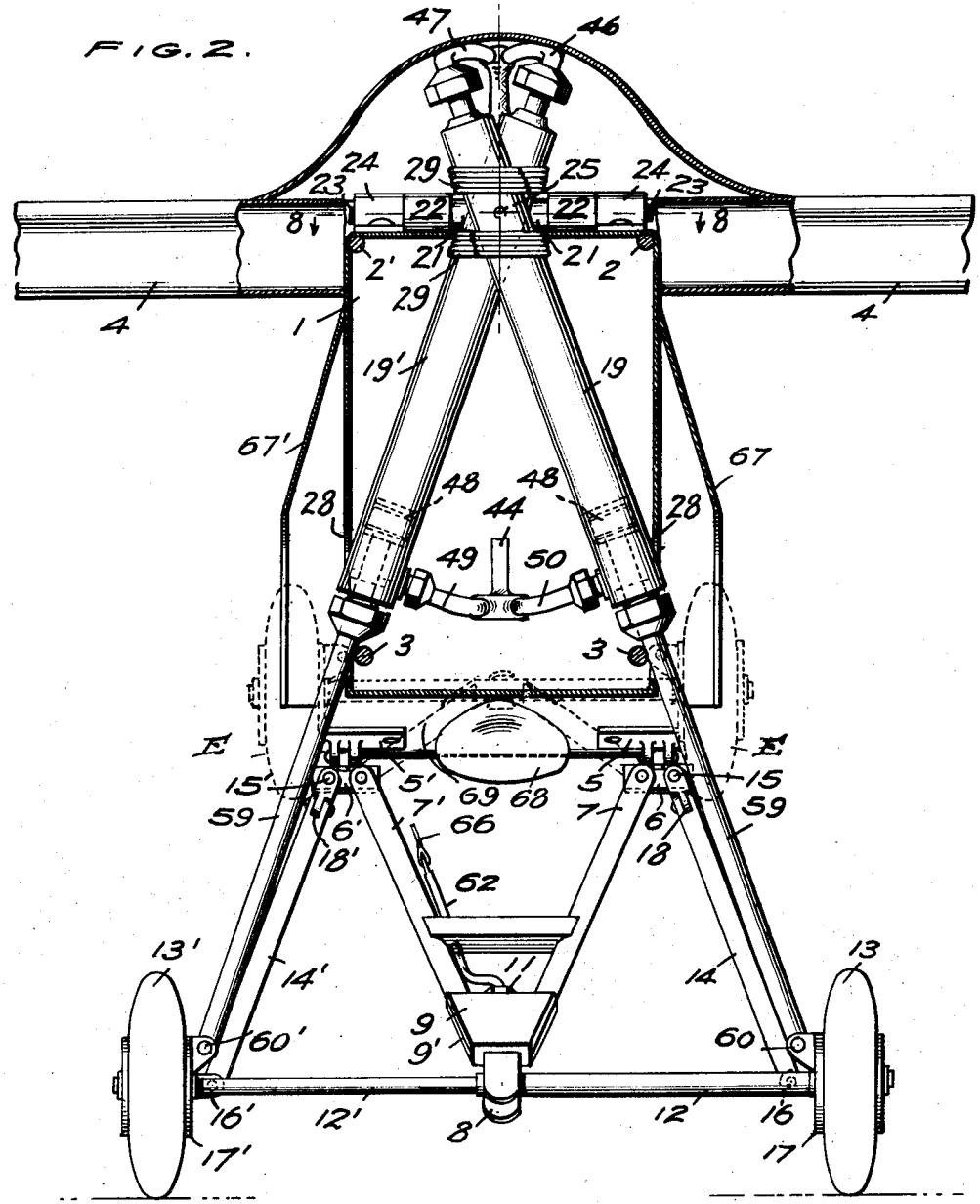

Nov. 27, 1934.    H. C. DOWNEY    1,981,856
RETRACTABLE LANDING GEAR
Filed Nov. 2, 1932    5 Sheets-Sheet 3
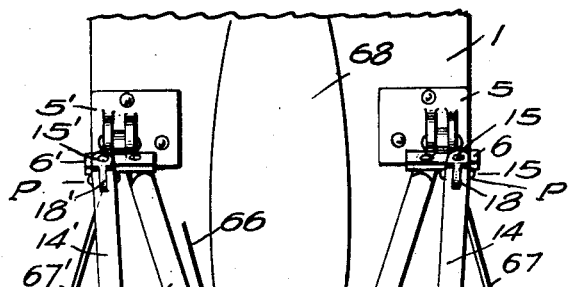
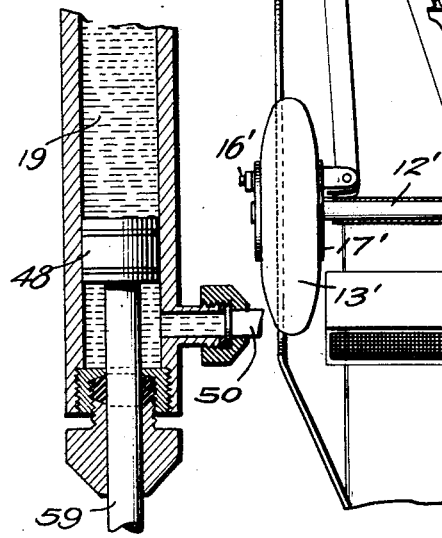
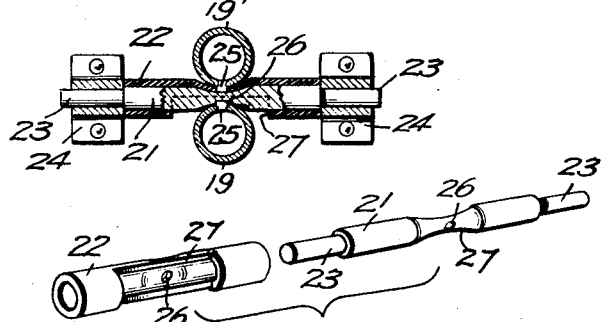
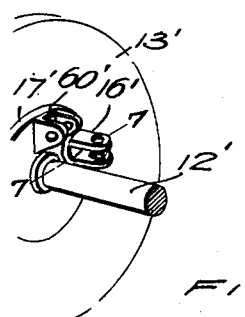
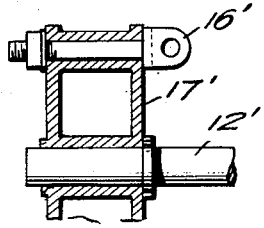
INVENTOR
HUGH C. DOWNEY
BY
ATTORNEYS

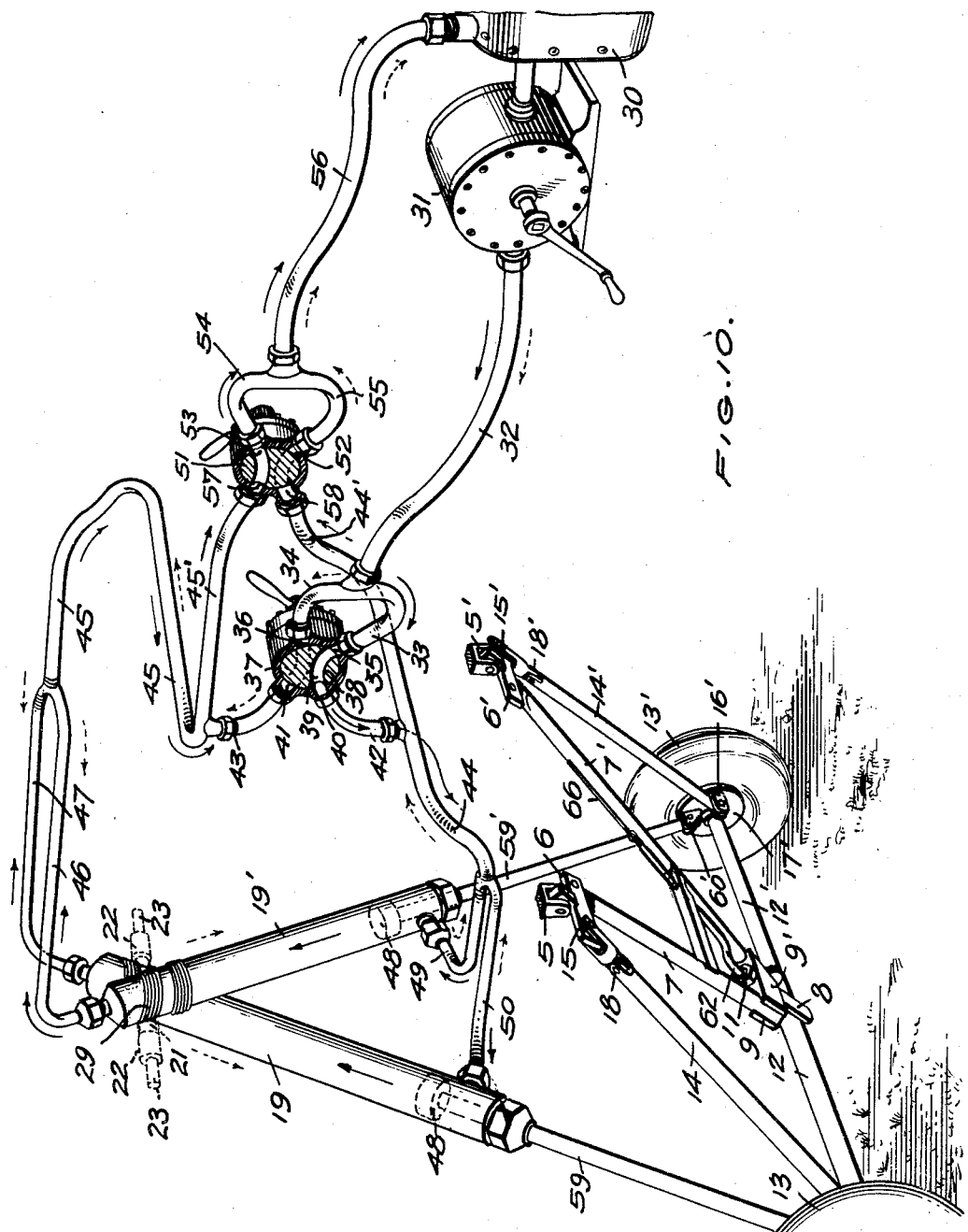

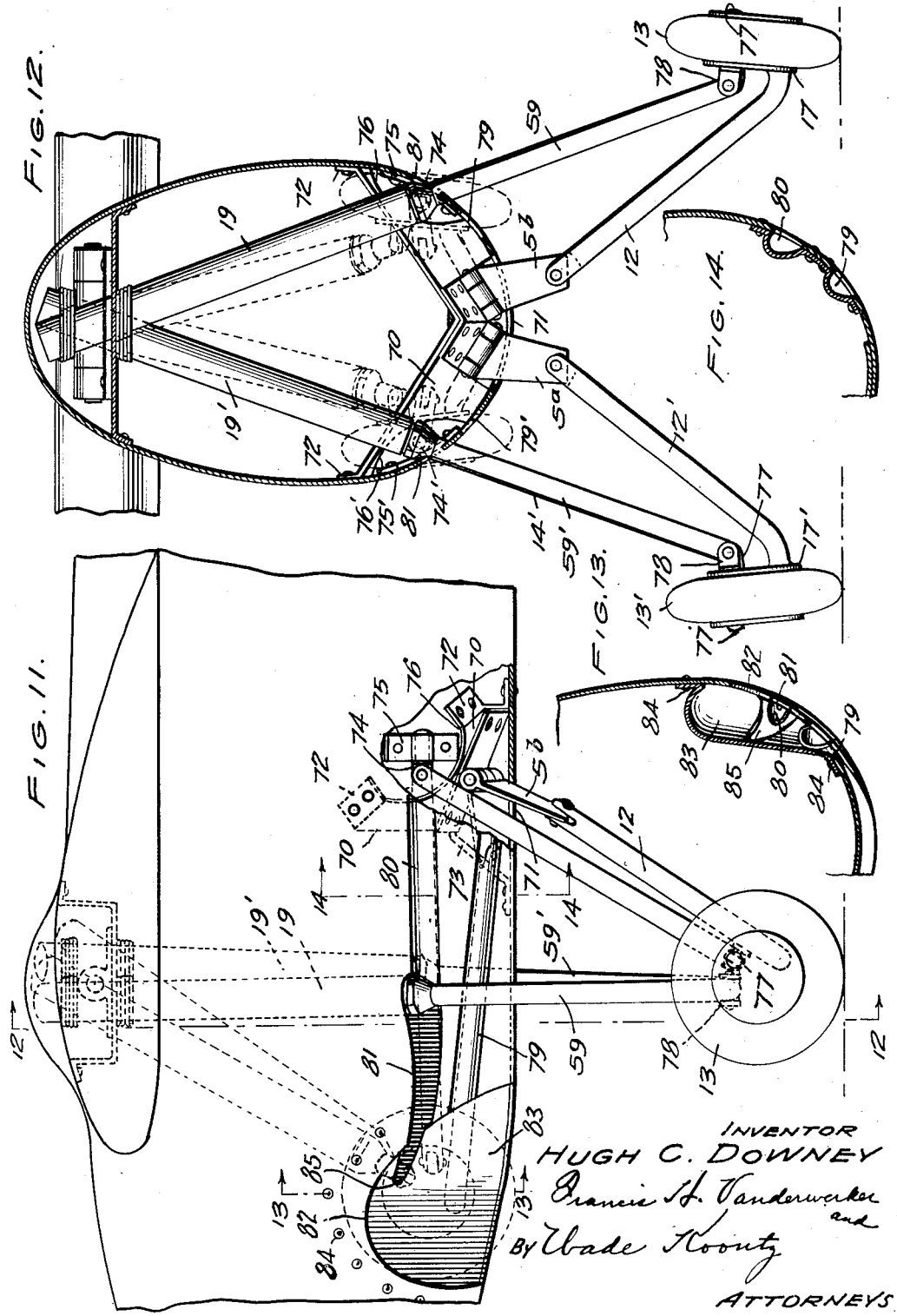

Patented Nov. 27, 1934

1,981,856

UNITED STATES PATENT OFFICE 1,981,856

RETRACTABLE LANDING GEAR

Hugh C. Downey, United States Army, Mitchell Field, Long Island, N. Y.

Application November 2, 1932, Serial No. 640,860

6 Claims. (Cl. 244—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to retractable landing gears for aircraft and it embodies certain new and valuable improvements in construction and methods of application and operation insuring a retractable landing gear which is simple, sure, and positive in operation, which requires few working parts, and which offers the minimum of head resistance.

The invention has for its objects and advantages: first, to provide a retractable landing gear applicable to all types of aircraft; second, utilizing the force of the air stream in the extension operation; third, employment of hydraulic means for actuating the landing gear in its movements of retraction and extension; and fourth, to avoid serious damage to the plane in the event of a landing made with the landing gear fully retracted.

It is a further object of the invention to provide a retractable landing gear which offers but slightly more drag and which weighs but slightly more than the conventional types of fixed, extended, landing gears.

In the drawings illustrating the invention:

Fig. 2 is a vertical cross sectional view on line 2—2 of Fig. 1.

Fig. 3 is a bottom plan view with the landing gear in retracted position;

Figure 1:
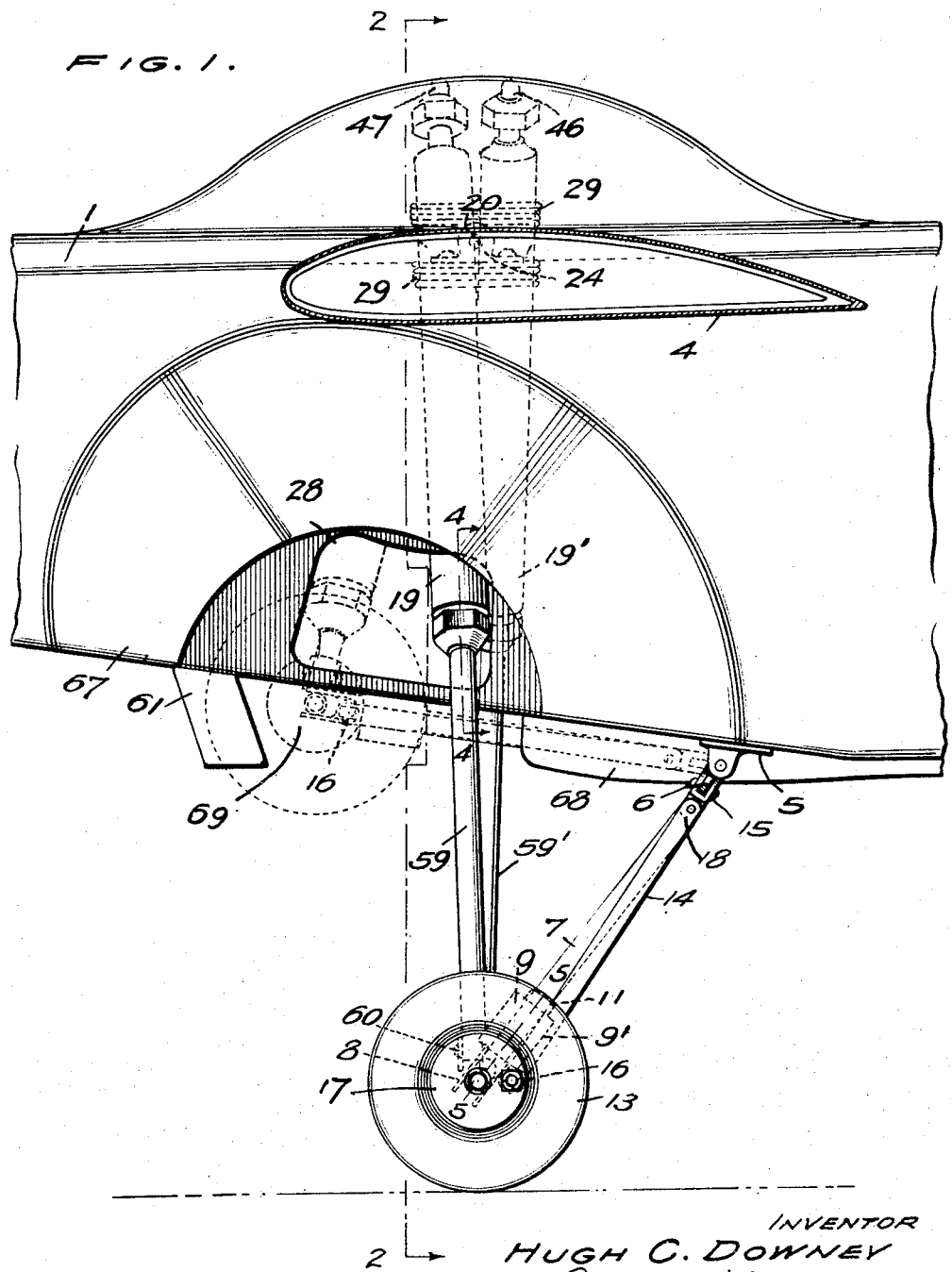
Fig. 1 is a side elevation of the improved landing gear as applied to an airplane fuselage.

Figures 4 to 9 inclusive are detail views, and

Figure 10 is a diagrammatic perspective view of the landing gear and operating assembly;

Figure 11 is a side elevation of a monocoque type of fuselage with the invention applied thereto in a modified form;

Figure 12 is a cross section on line 12—12 of Figure 11;

Figure 13 is a section on line 13—13 of Figure 11, and

Figure 14 is a section on line 14—14 of Figure 11.

In the drawings, 1 indicates a conventional airplane fuselage embodying top and bottom fuselage members or longerons 2 and 3 and a sustaining wing 4. Fixed to the bottom or belly of the fuselage is a pair of hinges including attaching plates 5 and 5' and pendant plates 6 and 6', each of the latter having a pin joint connection with its corresponding attaching plate so as to swing in the fore and aft direction of the airplane. Connected to the plates 6 and 6' are the legs 7 and 7' of a large V-brace which is movable with the plates 6 and 6' so that it can swing up against the belly of the fuselage. At the smaller or outer end of the V-brace is a forked clevis 8, suitably confined between the convergent portions of the legs 7 and 7' and the connecting plates 9 and 9', as shown in Figures 3 and 5, so as to be rotatable about its longitudinal axis. The shoulder 10 of the clevis fork and a shoulder-forming nut 11 screwed on the upper end of the clevis shank abut the plates 9 and 9' and prevent the displacement of the clevis from the brace. This V-brace reinforces the landing gear and in particular braces the landing gear axle which is straddled by, and which rides in, the forked clevis 8.

The landing gear axle is composed of telescopic sections, the outer axle 12 carrying the streamlined wheel 13 and telescoping the inner axle 12' carrying the streamlined wheel 13'. The wheels and axles are suspended from the fuselage by two supporting legs 14 and 14' connected at their upper ends to the plates 6 and 6' by hinge-joints 15 and 15' respectively and at their lower or outer extremities being hingedly connected by eyebolts 16 and 16' to the wheel bushings 17 and 17'. The legs 14 and 14' are further provided with hinge joints 18 and 18' breaking in planes at right angles to the breaking planes of the hinge-joint 15—15'. The arrangement of the hinge joints of both the V-brace and the axle-supporting legs is such that the V-brace articulates in a vertical plane only whereas the axle legs articulate in both vertical and horizontal planes, due to the fact that as the wheels are moved upwardly they also travel inwardly.

The operating means for the landing gear includes a pair of elongated oleo or hydraulic cylinders 19 and 19' installed in the fuselage forwardly of the bracket plates 6 so that the movement of the landing gear will be forwardly of the aircraft in retraction and rearwardly thereof in extension. Hence, the force of the air stream is utilized in the subsequent extension of the retracted gear which will render the extension of the gear practically automatic upon the release thereof and will require, in any event, a minimum of effort for extension. Cylinders 19 and 19' articulate fore and aft independently of each other and also laterally about an axis 20 (see Fig. 1) independently of each other. This independence of movement is obtained by the mounting shown to advantage in Figs. 8 and 9, and which includes inner and outer rotatable members 21 and 22, the former having journals 23 rotatably supported in bearing 24 fixed rigidly to the top fuselage members 2. Each oleo cylinder has a lug 25 which fits into an opening or socket 26 in one or the other of the cylinders; cylinder 19' being fitted to the outer member 22 and cylinder 19 being fitted to the inner member 21 through the cut-out 27 in the outer member 22. As will be apparent from Fig. 2, the oleo cylinders 19 and 19' are disposed laterally of each other and are inclined in a plane transversely of the fuselage, with their upper ends crossing on the center line of the fuselage and their lower divergent ends projected slightly beyond the sides of the fuselage through the side apertures 28. The oleo cylinders can be secured in several different ways and in the drawing they are disclosed as being lashed to the mounting by means of elastic cords 29 which allow independent movement in any direction.

The oil for the oleo cylinders is carried in a small tank 30, Fig. 10, from which it is fed by a pump 31 into the feed line 32 terminating in branches 33 and 34 having communication with the ports 35 and 36, respectively, of a rotary valve casing 37; the valve 38 of which has an arcuate oil passage 39 therethrough. Leading from ports 40 and 41 on the opposite side of the valve casing are tubes 42 and 43 which connect with the cylinder leads 44 and 45 each of which has separate branches leading to the respective cylinders, the branches 46 and 47 of the top lead 45 being connected to the tops of the cylinders for conducting the oil to and from the top side of each oleo leg piston 48 and the branches 49 and 50 being connected to the cylinders below the pistons, as shown in Fig. 6. A valve 51 similar in construction to the valve 37 but with the position of the valve passage reversed, is provided in the oil return line to the tank 30, being connected on one side through the ports 52 and 53 with the branches 54 and 55 of the tank return tube 56 and on the opposite side being connected through ports 57 and 58 with the extensions 45' and 44' of the top and bottom cylinder heads 45 and 44. When the valves are positioned as illustrated, the oil passes from the tank 30 and through the pump 31 to the bottom of both cylinders below the pistons 48 by way of the feed line 32, branch 33, valve port 35, valve passage 39, valve port 40, tube 42, bottom cylinder lead 44 and branches 49 and 50. As the pistons 48 are moved upwardly in the cylinders by the pressure of the incoming oil, the oil from above the pistons is forced back to the tank 30 by way of the branches 46 and 47 of top cylinder lead 45, top lead extension 45', valve port 57 of valve 51, through the valve passage to valve port 53, thence through branch 54 to the return tube 56. When the pistons are to be moved downwardly from a previously raised position within the cylinders, the valves 37 and 51 are reversed to place their respective valve passages in the dotted line positions indicated in which case the oil from the feed line 32 passes through the branch 34, valve ports 36 and 41 and through branch 43 into the top cylinder lead 45 through which it is conducted to the tops of the cylinders. The oil from below the pistons is returned to the tank by way of branches 49 and 50 of lead 44, extension 44', valve ports 58 and 52 of valve 51, branch 55, and return line 56.

In the normal extended position of the landing gear the axle-supporting legs 14 and 14' together with the V-brace, extend downwardly and forwardly of the fuselage, as illustrated in Fig. 1, with the landing gear axle below and substantially in line with the oleo cylinders, the oleo piston legs 59—59' are attached at their lower ends by pin joints 60—60' to the wheel bushings 17—17'. As the wheels 13—13' are moved upwardly, they also travel inwardly since such is their path due to the fixity of angle of the cylinders, the weight of the latter causing them to lie against the inner side of a groove in the skin of the fuselage or, as shown in Fig. 2, against the bottom longerons 3. Not only do the wheels travel inward but they also travel forward since the axle supporting legs 14—14' act as radius rods about the pivots P. When the pistons have reached the end of their upward travel in the retraction of the landing gear, the latter will be in the dotted line position E of Fig. 2 and the full line position of Fig. 3, with the landing wheels 13—13' alongside the radiator 61 and the landing wheel axle behind the radiator in the manner illustrated.

The axles 17—17', when extended to the limit of their relative travel, are locked by a locking device consisting of a long hardened taper pin 62 having a universal joint 62a and slidably supported in a guide bore 63 of the clevis 8 and extending through registering holes or openings 64—64' in the axle sections 12—12'. The pin is held in locking position by a spring 65 and has suitable connection 66 with means operated from the cockpit for withdrawal from the openings and providing a single positive control. This locking pin is withdrawn when the landing gear is to be retracted and releases the axles sections for their necessary inward travel. It reenters the openings 64—64' when the latter are again in registry during the extension of the axles. Should either wheel strike an obstruction, causing the axle to tilt, such movement is permitted without damage to the parts by reason of the universal joints 62a in the locking pin 62. The locking device and the V-brace reinforce the landing gear structure, particularly against side thrust which is taken up by locking pin structure.

To provide for housing the landing gear wheels, when same are retracted, with a minimum of head resistance, wheel housings 67—67' are provided on the sides of the fuselage 1 within the fuselage fairing and forwardly of the normal extended position of the landing gear. The landing wheels, in their retracted position, extend slightly below the fairing or housings so that a landing may be made without serious damage to the plane even though the landing is made with the landing gear fully retracted.

There is, of course, a great reduction in parasitic drag as well as in interference drag when the landing gear is folded up but in order to fair out the lines of the fuselage and further reduce resistance a streamlined belly tank 68 for gasoline is located on the underside of the fuselage and rearwardly of the radiator 61 from which it is spaced to provide an intervening pocket 69 accommodating the landing gear axle in the manner shown in Fig. 1. The legs 7—7' of the V-brace, in the folded position of the landing gear, are disposed along the sides of the tank 68 and the operating connections of the axle locking device extend along the legs 7—7' of the brace.

In the modified form disclosed in Figures 11 to 14 inclusive, the landing gear is substantially the same as that described in connection with Figures 1 to 13 inclusive in that it has the same type of suspension within the fuselage of the hydraulic cylinders 19 and 19', allowing the cylinders to move forward in order to bring the wheels 13 and 13' up into retracted position, as shown in Figure 11, although in the modified form of landing gear outward or spreading movement of the cylinders is not required. The main points of difference are as follows: The straight axle of telescoping sections is replaced by a split or divided axle in which the axle elements 12 and 12' are inclined upwardly to clear obstructions, being rigidly fixed at their lower ends to the wheel flanges 17 and 17' and attached at their upper ends to hinges 5a and 5b. There are thus two axles independent of each other, each of which is hinged at its upper end to the fuselage and fixed at its lower end to a wheel carrier. The hinges 5a and 5b are fastened to the bottom side of an upwardly and forwardly canted V-shaped, inner structure 70 with the leaves of the hinges depending through and operating in a clearance opening or slot 71 in the outer fuselage skin. The inner structure 70 fastens to the fuselage through its attaching flanges 72 and is suitably reinforced by the brace 73. The two axle struts or supporting legs 14 and 14' are pinned at their upper ends to swivel eyebolts 74 and 74'; the latter being journaled in bearing plates 75 and 75' fixed to the fuselage on the inner side thereof and within the cut-outs 76 and 76' in the inner structure 70, as shown to advantage in Figures 11 and 12. At their lower ends the axle struts 14 and 14' are pinned to swivel eyebolts 77 and 77' of the wheel bushings. The oleo piston legs 59 and 59' are connected at their lower ends by pin joints to the lugs 78 of the wheel bushing flanges 17 and 17'. The object of thus hinging the parts is to achieve a folding effect so that the axles 12 and 12', in the retraction of the gear, will fold up as a unit into grooves 79 and 79' in the belly of the fuselage and the axle struts 14 and 14' into grooves 80 and 80'. Grooves 80 and 80' merge into arcuate openings or slots provided in the side of the fuselage, as shown at 81 in Figure 11, to accommodate the hydraulic cylinders and piston legs of the landing gear operating mechanism, and these openings 81 together with the grooves 79 and 79' issue into the wheel housings of the fuselage which housings are respectively formed as shown in Figure 13 by an outside opening 82 in the wall of the fuselage and an inside shield plate 83 bolted or otherwise fastened to the fuselage as indicated at 84. The shield plate 83 is slotted at 85 in continuation of the slot 81 in the fuselage wall. The operation of this type of landing gear assembly is the same as described previously in connection with Figures 1 to 10 inclusive, the wheels moving forwardly, upwardly and inwardly when retracted hydraulically. In its modified form, the landing gear assembly embodies less moving parts and requires no lock since the oil pressure is sufficient to hold the gear in any position and the shock absorption action is effected without any lateral movement or spreading of the cylinders and wheels.

While the invention is applicable to all types of aircraft, for the feature of streamlining it lends itself particularly well to liquid cooled engine equipped airplanes in that the axle is readily retractable to a position intermediate the radiator and the belly fuel tank of the aircraft, thus aiding in streamlining.

I claim:

1. A retractable landing gear for airplanes including a pair of angularly disposed hydraulic cylinders crossing each other at their upper portions, means securing the said upper portions together and permitting the cylinders to articulate independently of each other fore and aft and also laterally, an axle of telescoped wheel-carrying sections; pistons in said cylinders having connection with the said wheel carrying sections of the said axle, and means for conducting fluid under pressure to and from opposite sides of the pistons for reciprocating same within the cylinder in the retraction and extension of the said landing gear.

2. A retractable landing gear for airplanes having, in combination, a fuselage provided on opposite sides with inwardly disposed and outwardly and downwardly opening housings forming side wheel-pockets and belly grooves leading to said wheel-pockets, the inner wall of each pocket having an aperture opening into the interior of the fuselage, a divided axle composed of separate independent axle elements hingedly connected to the fuselage and retractable forwardly and upwardly and inwardly into the belly grooves of the fuselage, wheels carried by said axle elements and adapted in the retracted position of the axle to be housed in the said wheel-pockets, and means within the fuselage and including axle-connected members movable inwardly and outwardly of the fuselage and through the apertures of the pocket for extending and retracting the said axle.

3. A retractable landing gear for an aircraft fuselage comprising a pair of landing wheels, a wheel supporting and bracing structure hingedly connected to the fuselage to fold upwardly and having articulated sections permitting the wheels to move inwardly as they are moved upwardly, and a retracting mechanism including a pair of fluid actuated extensible shock-absorbing and retracting members pivotally suspended and housed within the fuselage for movement fore and aft of the fuselage and also laterally thereof, said members diverging downwardly in a plane transversely of the fuselage with their respective extensible portions connected at the outer ends to the said wheel-supporting and bracing structure and slidable inwardly and outwardly of the fuselage through apertures in opposite sides of the latter.

4. A retractable landing gear for an aircraft fuselage including a landing gear axle of extensible sections, an axle-supporting structure hingedly connected to the fuselage and composed of articulated sections permitting movement of the axle in both vertical and horizontal planes, and releasable locking means carried by said structure and including a pin engageable in registering openings in the said axle sections and yieldable to any tilting action of the axle.

5. In a landing gear for aircraft, a pair of telescoped extensible axle-sections, each section having an opening adapted in the extended position of the sections to register with the opening in the other section, an axle-brace attachable at its upper end to the aircraft and having at its lower end an axle-straddling fork provided with a guide bore, and spring-tensioned locking pin slidably supported in said guide bore and having a flexibly jointed lower portion engageable in the registering openings of the said axle-sections.

6. In a retractable landing gear for aircraft, the combination with a fuselage having apertures in opposite sides adjacent the bottom thereof, of bearings fixed to the fuselage on opposite sides thereof above the center of gravity of the fuselage, relatively inner and outer rotatable members disposed transversely of the fuselage with the inner member rotatably supported in the said bearings and the outer member concentric to and revoluble about the inner member, each of said members being provided on relatively opposite sides and centrally of the fuselage with pivot sockets aligned in the fore-and-aft direction of the fuselage, the outer member being cut away to expose the pivot-socket of the inner member, a pair of oleo-cylinders disposed laterally of each other and inclined in a plane transversely of the fuselage with their upper ends crossing on the center line of the fuselage and their lower divergent ends terminating adjacent the bottom aperture of the fuselage, said cylinders having pivot-lugs engaged in the pivot sockets of the said inner and outer members respectively, a landing gear chassis hingedly connected with the underside of the fuselage to swing upwardly and downward with respect thereto, oleo-piston legs connected with said chassis through the apertures of the fuselage, and means for sliding the oleo-piston inwardly and outwardly of the cylinders and fuselage in the extension legs and retraction of the said landing gear.

HUGH C. DOWNEY.